United States Patent
Toda et al.

(10) Patent No.: US 6,332,698 B1
(45) Date of Patent: Dec. 25, 2001

(54) AUTOMATIC LEVELING APPARATUS FOR USE WITH VEHICLE HEADLAMPS

(75) Inventors: Atsushi Toda; Hideaki Takeuchi; Makoto Izawa, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/372,050

(22) Filed: Aug. 11, 1999

(30) Foreign Application Priority Data

Sep. 18, 1998 (JP) .................................................. 10-264221

(51) Int. Cl.⁷ ....................................................... B60Q 1/10
(52) U.S. Cl. ............................ 362/465; 362/466; 701/49; 701/36
(58) Field of Search ................................... 362/464–467; 701/36, 49, 124

(56) References Cited

U.S. PATENT DOCUMENTS 5,191,530 * 3/1993 Hussmann et al. .................... 701/49

FOREIGN PATENT DOCUMENTS

| 0 808 401 | 10/1997 | (EP) | B60Q/1/115 |
| 2 309 773 | 8/1997 | (GB) | B60Q/1/115 |
| 2 309 774 | 8/1997 | (GB) | B60Q/1/115 |

* cited by examiner

Primary Examiner—Sandra O'Shea
Assistant Examiner—Ismael Negron
(74) Attorney, Agent, or Firm—Sughrue Mion, PLLC (57) ABSTRACT

An automatic leveling apparatus includes a headlamp whose light axis is pivoted in a vertical direction relative to a vehicle body by an actuator 10; a control unit 16 for controlling the operation of the actuator 10; vehicle speed detection device 12 for detection of the speed of the vehicle; and pitch angle detection device 14 for detecting a pitch angle of the vehicle. When the pitch angle detection device 14 detects a pitch angle $\theta_2$ while the vehicle is in a stable traveling state, the control unit 16 controls the operation of the actuator 10 in consideration of the pitch angle $\theta_2$. Consequently, the actuator is prevented from being controlled on the basis of a pitch angle obtained when the vehicle stops facing downhill or in an unnatural position such as in which the wheels on one side of the vehicle are on the curb.

11 Claims, 5 Drawing Sheets

AUTOMATIC LEVELING APPARATUS FOR USE WITH VEHICLE HEADLAMPS

BACKGROUND OF THE INVENTION

1. Field of the Invention

The present invention relates to an automatic leveling apparatus which automatically tilts the light axis of a headlamp in such a direction as to offset a pitch angle (an inclination of a vehicle in the longitudinal direction thereof). More particularly, the present invention relates to an automatic leveling apparatus for automatically controlling the alignment of the light axis of the headlamp in a vertical direction on the basis of a pitch angle obtained while the vehicle is stationary.

2. Related Art

A headlamp of this type is built such that, for example, a reflector equipped with a light source is supported on a lamp body so as to be tiltable about a horizontal axis, and such that the light axis of the reflector (headlamp) can be pivoted about the horizontal axis by means of an actuator.

A known automatic leveling apparatus comprises pitch angle detection means and a vehicle speed sensor, both of which are mounted on a vehicle, and a control section for controlling operation of an actuator on the basis of detection signals output from the detection means and the sensor. The light axis of a headlamp (reflector) is controlled so as to constantly remain in a predetermined position relative to the road surface.

Automatic leveling comprises dynamic automatic leveling for constantly effecting an automatic leveling operation either while the vehicle is travelling or stationary, and static automatic leveling for effecting an automatic leveling operation while the vehicle is stationary.

During the dynamic automatic leveling operation, a leveling operation is performed in real time in response to a change in the orientation of a vehicle stemming from acceleration and deceleration during travel, as well as to a change in the weight of the vehicle stemming from loading and unloading of cargo on or from the vehicle during halts. For this reason, the actuator is operated a very large number of times, thus consuming a large amount of power. Further, components constituting a drive mechanism, such as a motor and gears, are required to have great durability, thus adding to cost.

In contrast, the static automatic leveling operation is basically directed toward a leveling operation performed during stoppage of the vehicle. For this reason, a correct pitch angle can easily be detected. Since the number of times the actuator is operated is small, power consumption is correspondingly low. Components constituting a drive mechanism, such as a motor and a gear, do not require great durability. Hence, the conventional automatic leveling apparatus is advantageously inexpensive. Such an automatic leveling apparatus has received attention from the headlamp industry.

When a vehicle stops while facing downhill or such that the wheels on one side of the vehicle are on the curb, the orientation of the vehicle is changed regardless of loads imposed on the vehicle (i.e., the sum of the weights of passengers and cargo). If the automatic leveling operation is carried out while the vehicle is stationary, the light axis of the headlamp may be changed excessively upward or downward, thus resulting in improper leveling.

SUMMARY OF THE INVENTION

The present invention has been conceived in view of the foregoing drawbacks in the related art, and the object of the present invention is to provide an apparatus capable of automatically leveling automobile headlamps by employing, for automatic static leveling, some of the components normally used for automatic dynamic leveling.

To achieve this object, the present invention provides an automobile headlamp automatic leveling apparatus comprising:

a headlamp whose light axis is tilted upward and downward in relation to a vehicle body by means of an actuator;

a control unit for controlling the operation of the actuator;

vehicle speed detection means for detection of the speed of the vehicle; and pitch angle detection means for detecting a pitch angle of the vehicle, wherein the control unit controls the operation of the actuator on the basis of a detected pitch angle such that the light axis of the headlamp maintains a constant, predetermined angle in relation to the road surface, the apparatus being characterized in that the control unit controls the operation of the actuator only when the vehicle is stationary and when the vehicle is in a stable traveling state. Accordingly, the number of times the actuator is operated is small, which in turn results in power conservation. Further, the constituent members of a drive mechanism undergo less wear.

During travel, the orientation (i.e., pitch angle) of the vehicle changes frequently. In contrast, the orientation (i.e., pitch angle) of the vehicle while the vehicle is in a stable traveling state is stable and can be readily detected. Further, the pitch angle detected while the vehicle is in a stable traveling state is substantially equal to that obtained while the vehicle is stationary.

Preferably, the control unit controls the operation of the actuator on the basis of the pitch angle obtained while the vehicle is stationary, and in a case where the pitch angle detection means detects a pitch angle while the vehicle is in a stable traveling state, the control unit controls the operation of the actuator in consideration of the thus-detected pitch angle.

Since the pitch angle obtained while the vehicle is in a stable traveling state is taken into consideration, an automatic leveling operation is prevented from being effected on the basis of a false pitch angle obtained while the vehicle is stationary.

Preferably, the control unit controls the operation of the actuator on the basis of the pitch angle obtained while the vehicle is in a stable traveling state in place of the pitch angle obtained while the vehicle is stationary.

As a result, an automatic leveling operation is prevented from being performed on the basis of a false pitch angle obtained while the vehicle is stationary.

Preferably, when a difference between the pitch angle obtained while the vehicle is in a stable traveling state and the pitch angle obtained while the vehicle is stationary exceeds a predetermined value, the control unit controls the operation of the actuator on the basis of the pitch angle obtained while the vehicle is in a stable traveling state in place of the pitch angle obtained while the vehicle is stationary.

A correct pitch angle is detected while the vehicle is stationary rather than while the vehicle is in a stable traveling state. If the pitch angle obtained while the vehicle is in a stable traveling state is analogous to the pitch angle obtained while the vehicle is stationary, the pitch angle obtained while the vehicle is stationary is considered more accurate and is used as control data. If a large difference exists between the pitch angles, the pitch angle obtained while the vehicle is stationary has a great possibility of being in error. Since the pitch angle obtained while the vehicle is in a stable traveling state is used as control data, an automatic leveling operation is prevented from being effected on the basis of the false pitch angle obtained while the vehicle is stationary.

In one preferred mode of the present invention, when a difference between the pitch angle obtained while the vehicle is in a stable traveling state and the pitch angle obtained while the vehicle is stationary exceeds a predetermined value, the operation of the actuator is controlled on the basis of a mean value of pitch angles obtained by the pitch angle detection means at a plurality of times during which the vehicle travels stably, or on the basis of the pitch angle value which most frequently occurs.

If a large difference exists between the pitch angle obtained while the vehicle is stationary and the pitch angle obtained while the vehicle is in a stable traveling state, the pitch angle obtained while the vehicle is in a stable traveling state may be false. Hence, the pitch angle while the vehicle is in a stable traveling state is obtained several additional times, and a mean pitch angle of the thus-detected pitch angles, or a pitch angle which most frequency occurs, is used as a pitch angle, thus correcting the pitch angle.

In one preferred mode, the time required to detect a pitch angle while the vehicle is in a stable traveling state is set so as to be longer than the time required for detecting a pitch angle while the vehicle is stationary.

If the time required for detecting a pitch angle is long, a large number of data sets (or signals) can be produced at one time, thus diminishing the influence of external perturbations on detection of a pitch angle. During travel of the vehicle, the orientation of the vehicle is susceptible to change due to acceleration, deceleration, or irregularities on the road surface. Thus, data (or signals) detected by a single detection operation is likely to include several improper data sets (signals). However, even when the detected data include several improper data sets (signals), the detected data approximate correct data if the number of data sets is large.

DETAILED DESCRIPTION OF THE PREFERRED EMBODIMENTS

Preferred modes or embodiments of the present invention will be described by reference to examples.

Figure 1:
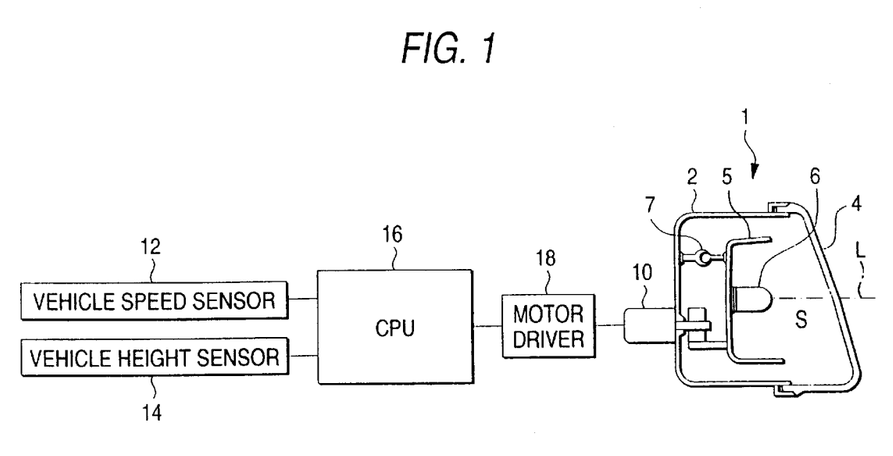
FIG. 1 is a view showing the overall configuration of an apparatus for automatically leveling automobile headlamps according to a first embodiment of the present invention.
Figure 2:
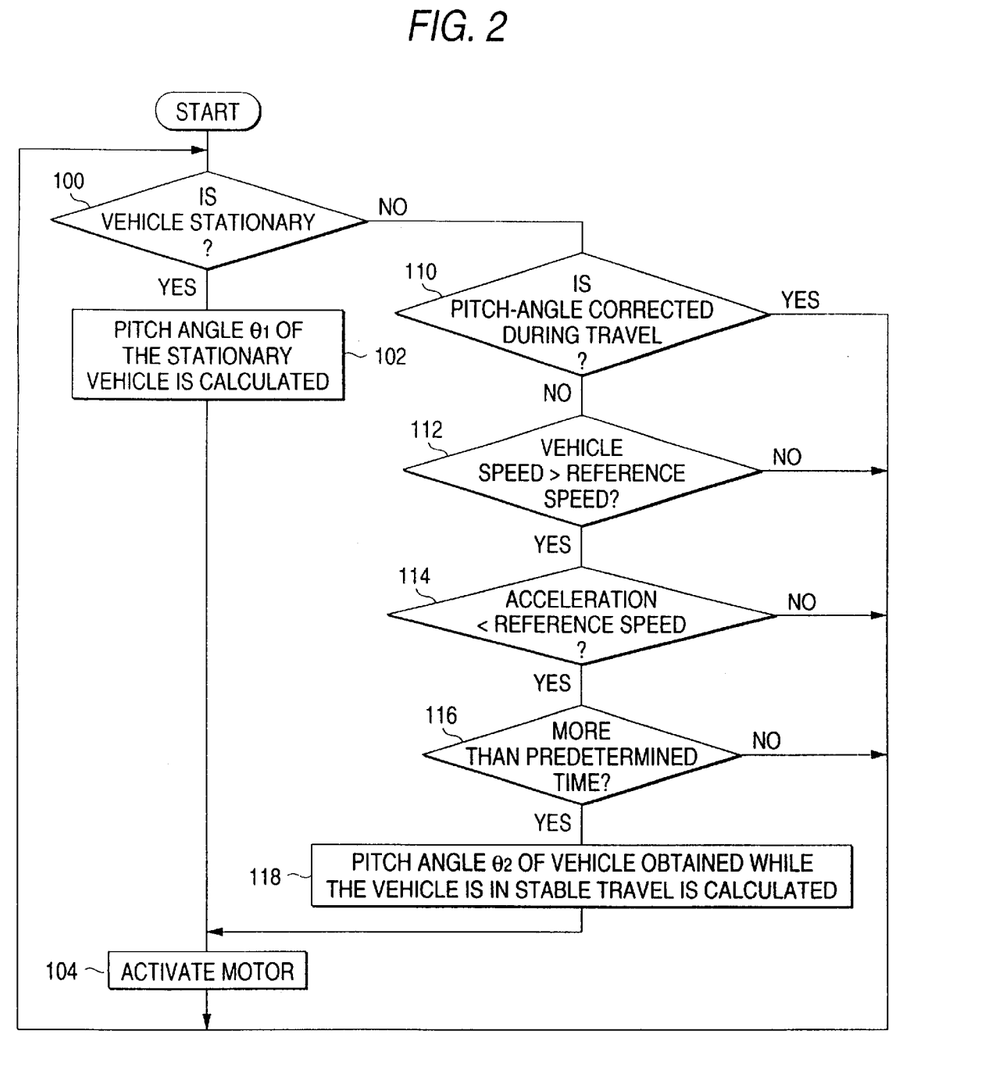
FIG. 2 shows a flowchart pertaining to a control unit of the automatic leveling apparatus according to the first embodiment.

FIGS. 1 and 2 show a first embodiment of the present invention. FIG. 1 shows the overall configuration of an apparatus for automatically leveling automobile headlamps according to the first embodiment; and FIG. 2 shows a flowchart pertaining to a control unit of the automatic leveling apparatus.

Reference numeral 1 shown in FIG. 1 designates an automobile headlamp. A front lens 4 is attached to the front opening section of a lamp body 2, thus constituting a lamp chamber S. A parabolic reflector 5 having a light bulb 6 fitted therein is supported in the lamp chamber S so as to be pivotable about a horizontal pivotal axis (an axis perpendicular to the drawing sheet of FIG. 1). The reflector 5 can be pivoted by means of a motor 10 which serves as an actuator.

An automatic leveling apparatus for use with the headlamp 1 comprises the motor 10 serving as an actuator for pivoting the light axis L of the headlamp 1 in a vertical direction; a vehicle speed sensor 12 serving as vehicle speed detection means for detecting the speed of a vehicle; a vehicle height sensor 14 constituting a part of means for detecting a pitch angle of the vehicle; and a CPU 16 which computes the speed and pitch angle of the vehicle on the basis of signals output from the vehicle speed sensor 12 and the vehicle height sensor 14 and which outputs a signal to a motor driver 18 for driving the motor 10 according to preset conditions.

Upon receipt of a signal from the vehicle speed sensor 12, the CPU 16 computes the speed and acceleration of the vehicle on the basis of the signal, thus determining whether or not the vehicle is stationary or travelling or whether or not the vehicle travels stably.

Upon receipt of a signal from the vehicle height sensor 14, the CPU 16 calculates the inclination of the vehicle in a longitudinal direction (i.e., the pitch angle of the vehicle) from the signal corresponding to the amount of displacement of the vehicle's suspensions. In a case where the vehicle height sensor comprises two sensors; i.e., a sensor disposed on a set of front wheels and another sensor provided on a set of rear wheels, a pitch angle can be determined from the amount of displacement of vehicle height in the longitudinal direction and the length of a wheel base. In contrast, in a case where the vehicle height sensor comprises a single sensor disposed on either a set of front wheels or a set of rear wheels, a pitch angle can be estimated from the amount of variation in the vehicle height. The CPU 16 outputs a signal to the motor driver 18 for pivoting the light axis L through a predetermined angle so as to cancel the pitch angle.

At the time of detection of a signal from the vehicle height sensor 14, the CPU 16 performs an operation by use of a comparatively high sampling time while the vehicle is stationary. While the vehicle is traveling, in order to exclude external perturbations, the pitch angle of the vehicle is calculated only when the vehicle speed is equal to or faster than a reference value, an acceleration is equal to or smaller than a reference value, and this state (i.e., the vehicle speed is equal to or greater than the reference speed and the acceleration of the vehicle is equal to or smaller than the reference value) is in effect for more than a predetermined continuous period of time.

When the vehicle travels over a bad road including factors which will cause external perturbations, such as irregularities on the road surface, the vehicle cannot travel at a speed of more than 30 km/h. An appropriate measure for preventing hard acceleration or deceleration, which would otherwise change the orientation of the vehicle, is to limit the acceleration of the vehicle to 0.5 m/s2 or less. Stable travel is achieved under conditions that a travel speed of 30 km/h or more and an acceleration of 0.5 m/s2 or less are continued for more than three seconds. Since the pitch angle of the vehicle is calculated only when the above conditions are satisfied, detection of a sporadic, abnormal value or influence of such an abnormal value on the calculation of a pitch angle is prevented.

Next, the control of operation of the motor 10 by the CPU 16 that acts as a control unit is described according to a flowchart shown in FIG. 2.

In step 100, the CPU 16 determines, on the basis of a signal output from the vehicle speed sensor 12, whether or not the vehicle is stationary. If YES (stationary) is selected in step 100, a pitch angle $\theta_1$, of the stationary vehicle is calculated in step 102. On the basis of the pitch angle $\theta_1$, in step 104 a signal is output to the motor driver 18 in order to activate the motor 10, and processing returns to step 100.

If NO (traveling) is selected in step 100, in step 110 the CPU 16 determines whether or not the pitch angle is corrected during travel of the vehicle. If NO (i.e., the pitch angle is not corrected during travel) is selected in step 110, in step 112 the CPU 16 determines whether or not the vehicle speed exceeds a reference speed (30 km/h). If YES (the vehicle speed exceeds 30 km/h) is selected in step 112, in step 114 the CPU 16 determines whether or not the acceleration is less than a reference acceleration (0.5 m/s$^2$). If YES (acceleration is less than 0.5 m/s$^2$) is selected in step 114, in step 116 the CPU 16 determines whether or not the vehicle speed exceeds 30 km/h and whether or not the acceleration of less than 0.5 m/s$^2$ is continued for more than a predetermined time (three seconds). If YES is selected in step 116 (i.e., the acceleration of 0.5 m/s$^2$ is continued for more than three seconds), processing proceeds to step 118, where a pitch angle $\theta_2$ of the vehicle obtained while the vehicle is in stable travel is calculated. In step 104, the result of such calculation is output to the motor driver 18 so as to activate the motor 10 on the basis of the pitch angle $\theta_2$. Processing then returns to step 100.

If YES (the pitch angle is corrected during travel) is selected in step 110, or if NO is selected in one of the steps 112, 114, and 116 (i.e., when the vehicle speed is less than the reference value of 30 km/h, the acceleration of the vehicle is more than the reference value of 0.5 m/s$^2$, or such a state is not continued for more than three seconds), processing returns to step 100.

Figure 3:
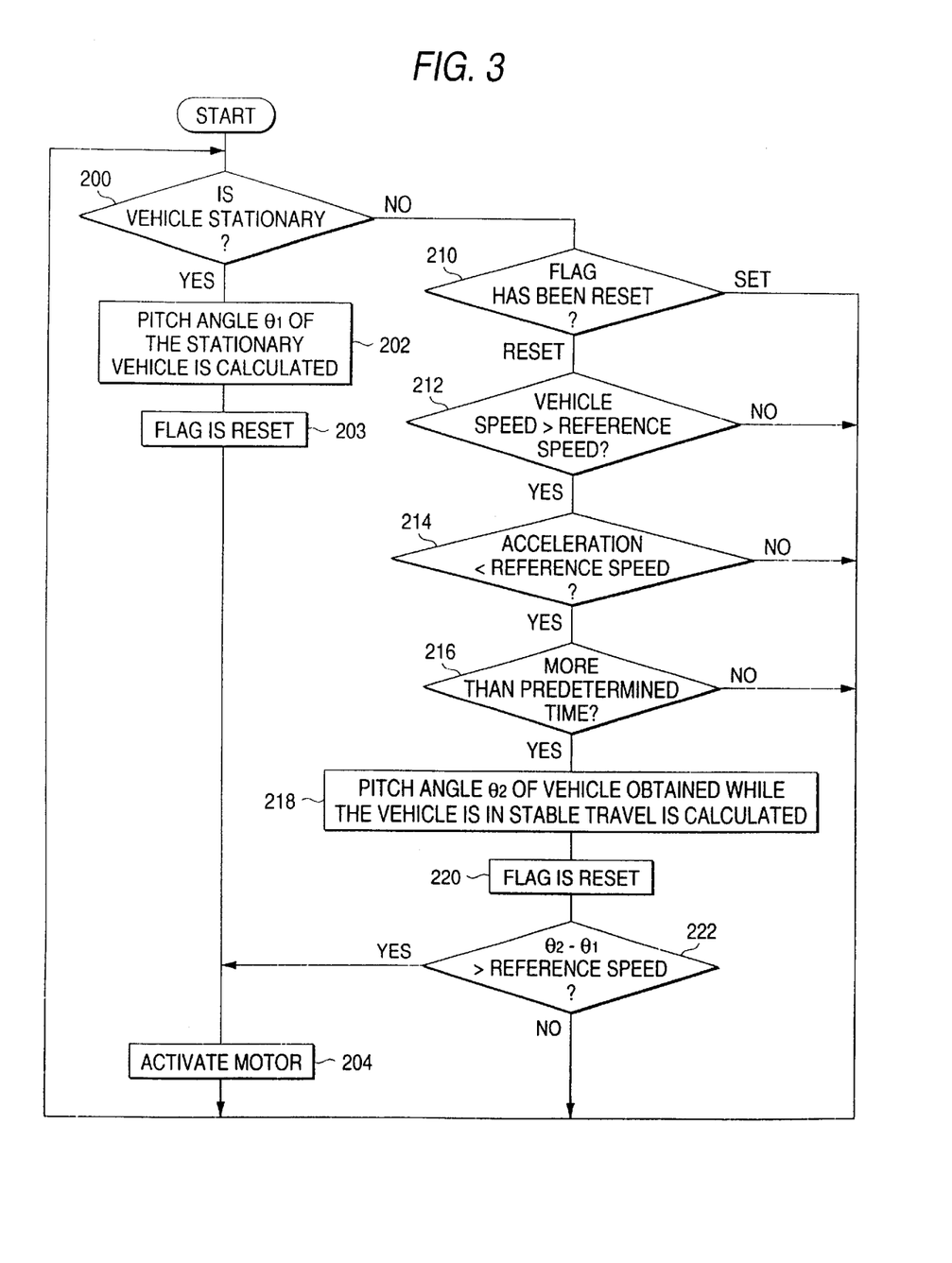
FIG. 3 is a flowchart showing a flow of operation relating to a control unit which serves as the principal section of a headlamp automatic leveling apparatus according to a second embodiment of the present invention.

FIG. 3 is a flowchart showing a flow of operation relating to a control unit which serves as the principal section of a headlamp automatic leveling apparatus according to a second embodiment of the present invention.

In the first embodiment, the pitch angle $\theta_2$ is detected, and the pitch angle $\theta_1$ is inevitably corrected so as to become equal to the pitch angle $\theta_2$. In contrast, in the second embodiment, only when the difference between the pitch angle $\theta_1$ and the pitch angle $\theta_2$ is greater than a predetermined reference value, the pitch angle $\theta_1$ is corrected so as to become equal to the pitch angle $\theta_2$.

In short, the CPU 16 determines, in step 200 on the basis of a signal output from the vehicle speed sensor 12, whether or not the vehicle is stationary. If YES (stationary) is selected in step 200, the pitch angle $\theta_1$ is calculated in step 202. If a flag has already been set, the flag is reset in step 203. In step 204, on the basis of the pitch angle $\theta_1$, a signal is output to the motor driver 18 so as to activate the motor 10, and processing returns to step 200.

If NO is selected in step 200, in step 210 the CPU 16 determines whether or not the flag has been set. If the flag has already been reset, in step 212 the CPU 16 determines whether or not the vehicle speed exceeds the reference value (of 30 km/h). If YES is selected in step 212 (i.e., the vehicle speed is determined to exceed 30 km/h), in step 214 the CPU 16 determines whether or not the acceleration of the vehicle is less than the reference value (of 0.5 m/s$^2$). If YES is selected in step 214 (i.e., if the acceleration is determined to be less than 0.5 m/s$^2$), in step 216 the CPU 16 determines whether or not the such a state is continued for more than a predetermined period of time (three seconds). If YES is selected in step 216 (i.e., the state is continued for more than three seconds), processing proceeds to step 218, where the pitch angle $\theta_2$ is calculated. In step 220, the flag is set, and processing proceeds to step 222.

In step 222, the CPU 16 determines whether or not a difference between the thus-calculated pitch angle $\theta_2$ and the pitch angle $\theta_1$ is greater than a predetermined reference value (more than 0.1 degree). If YES is selected (i.e., the pitch angle difference is greater than 0.1 degree), a signal is output in step 204 to the motor driver 18 in order to activate the motor 10 on the basis of the pitch angle $\theta_2$. Processing then returns to step 200. If NO is selected in step 222 (i.e., the difference between the pitch angles $\theta_1$ and $\theta_2$ is less than 0.1 degrees), processing returns to step 200.

If NO is selected in step 210 (i.e., when the flag has been set) or NO is selected in one of steps 212, 214, and 216 (i.e., when the vehicle speed is less than the reference speed, the acceleration is greater than the reference value, or a predetermined period of time has not yet lapsed), processing returns to step 200.

Figure 4:
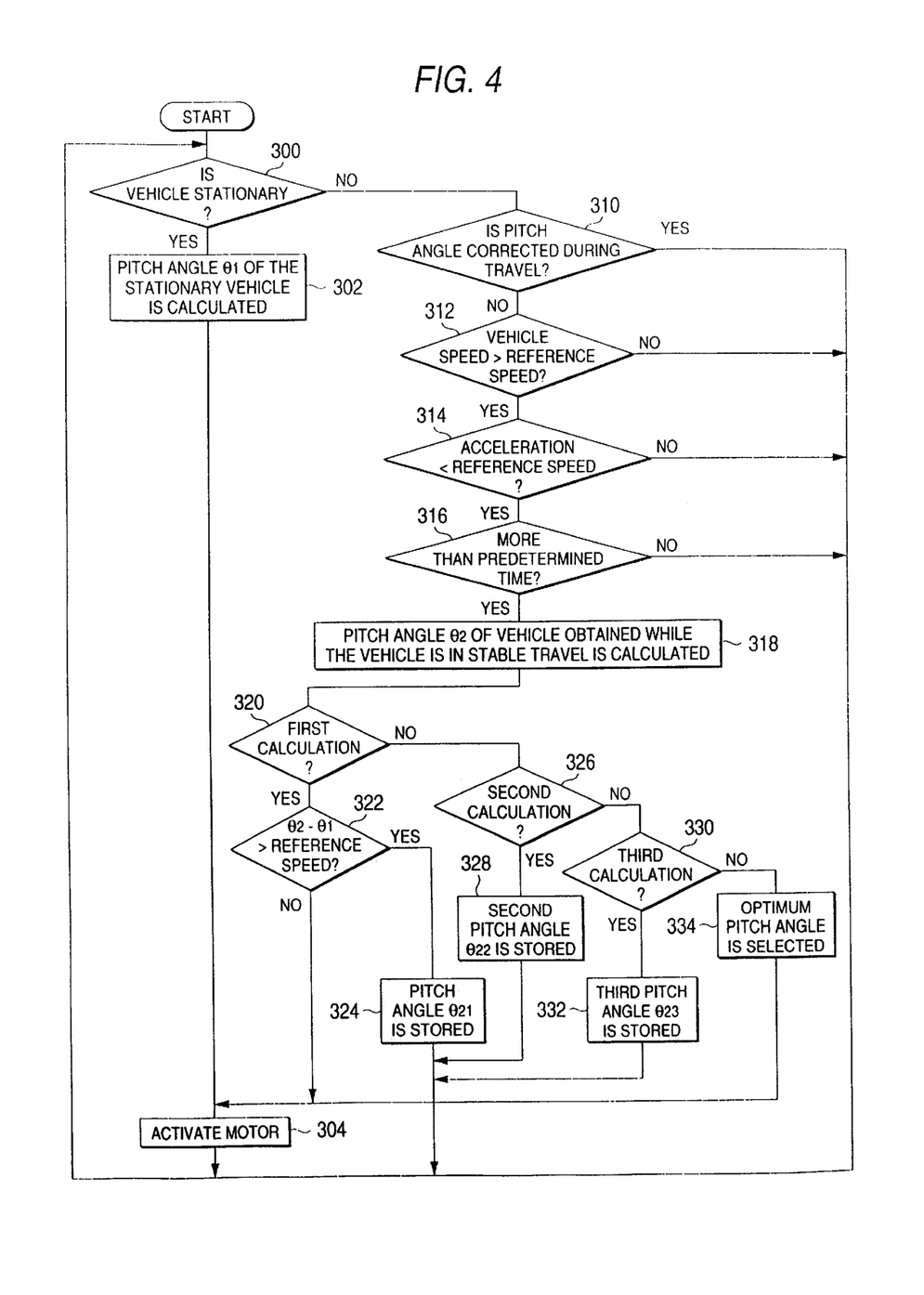
FIG. 4 is a flowchart showing a flow of operation relating to a control unit which serves as the principal section of a headlamp automatic leveling apparatus according to a third embodiment of the present invention.

FIG. 4 is a flowchart showing a flow of operation relating to a control unit which serves as the principal section of a headlamp automatic leveling apparatus according to a third embodiment of the present invention.

The third embodiment differs from the first and second embodiments in that when the difference between the pitch angles $\theta_1$ and $\theta_2$ is smaller than the predetermined reference value, the pitch angle $\theta_2$ is used as control data. In contrast, if the difference is greater than the predetermined reference value, the pitch angel $\theta_2$ is detected two or more times while the vehicle is in a stable traveling state. A mean angle of the thus-detected pitch angles $\theta_2$, or a pitch angle which most frequently occurs, is used as control data.

Steps 300, 302, and 304 are identical with steps 100, 102, and 104, respectively. Further, steps 310, 312, 314, 316, and 318 are identical with steps 110, 112, 114, 116, and 118, respectively. Hence, repetition of their explanations is omitted here.

Processing shifts from step 318 to step 320, in which the CPU 16 determines whether or not the calculation in step 318 of the pitch angle $\theta_2$ while the vehicle is in a stable traveling state represents the first calculation. If YES is selected in step 320 (i.e., the calculation of the pitch angle $\theta_2$ representing the first calculation), processing proceeds to step 322. The CPU 16 then determines whether or not a difference between the pitch angles $\theta_1$ and $\theta_2$ is greater than the predetermined reference value (0.1 degree). If NO is selected (i.e., the difference is less than the predetermined reference value of 0.1 degree), in step 304 a signal is output to the motor driver 18 on the basis of the pitch angle $\theta_2$ in order to activate the motor 10. Processing then returns to step 300.

If YES is selected in step 322 (i.e., the difference between the pitch angles $\theta_1$ and $\theta_2$ is greater than 0.1 degree), processing then proceeds to step 324. The pitch angle $\theta_2$ ($\theta_{21}$) is stored in a storage section, and processing then returns to step 300. If NO is selected in step 320 (i.e., the calculation of the pitch angle $\theta_2$ in step 318 does not represent the first calculation), processing proceeds to step 326. The CPU 16 determines whether or not the calculation of the pitch angle $\theta_2$ in step 318 represents the second calculation. If YES is selected in step 326 (i.e., the calculation of the pitch angle $\theta_2$ represents the second calculation), processing proceeds to step 328. The second pitch angle $\theta_{22}$ is stored in the storage section, and processing returns to step 300. In contrast, if NO is selected in step 326 (the calculation of the pitch angle $\theta_2$ does not represent the second calculation), processing returns to step 330. The CPU 16 determines whether or not the calculation of the pitch angle $\theta_2$ in step 318 represents the third calculation. IF YES is selected in step 330 (i.e., the calculation of the pitch angle $\theta_2$ represents the third calculation), processing then proceeds to step 332. A third pitch angle $\theta_{23}$ obtained while the vehicle is in a stable traveling state is stored in the storage section, and processing returns to step 300. If NO is selected in step 330 (the calculation of the pitch angle $\theta_2$ represents not the third calculation but the fourth calculation), processing proceeds to step 334. A mean value of the pitch angles $\theta_{21}$, $\theta_{22}$ and $\theta_{23}$ obtained at the first through third states in which the vehicle travels stably, or a pitch angle which most frequently occurs, is selected as an optimum pitch angle. Processing then proceeds to step 304. In step 304, a signal is output to the motor driver 18 on the basis of the optimum pitch angle so as to activate the motor 10, and processing returns to step 300.

If NO is selected in step 310 (the pitch angle is not corrected at the time of travel of the vehicle), or if NO is selected in any one of steps 312, 314, and 316 (when the vehicle speed is lower than the reference value, the acceleration is greater than the reference value, or a predetermined period of time has not yet elapsed), processing returns to step 300.

Figure 5:
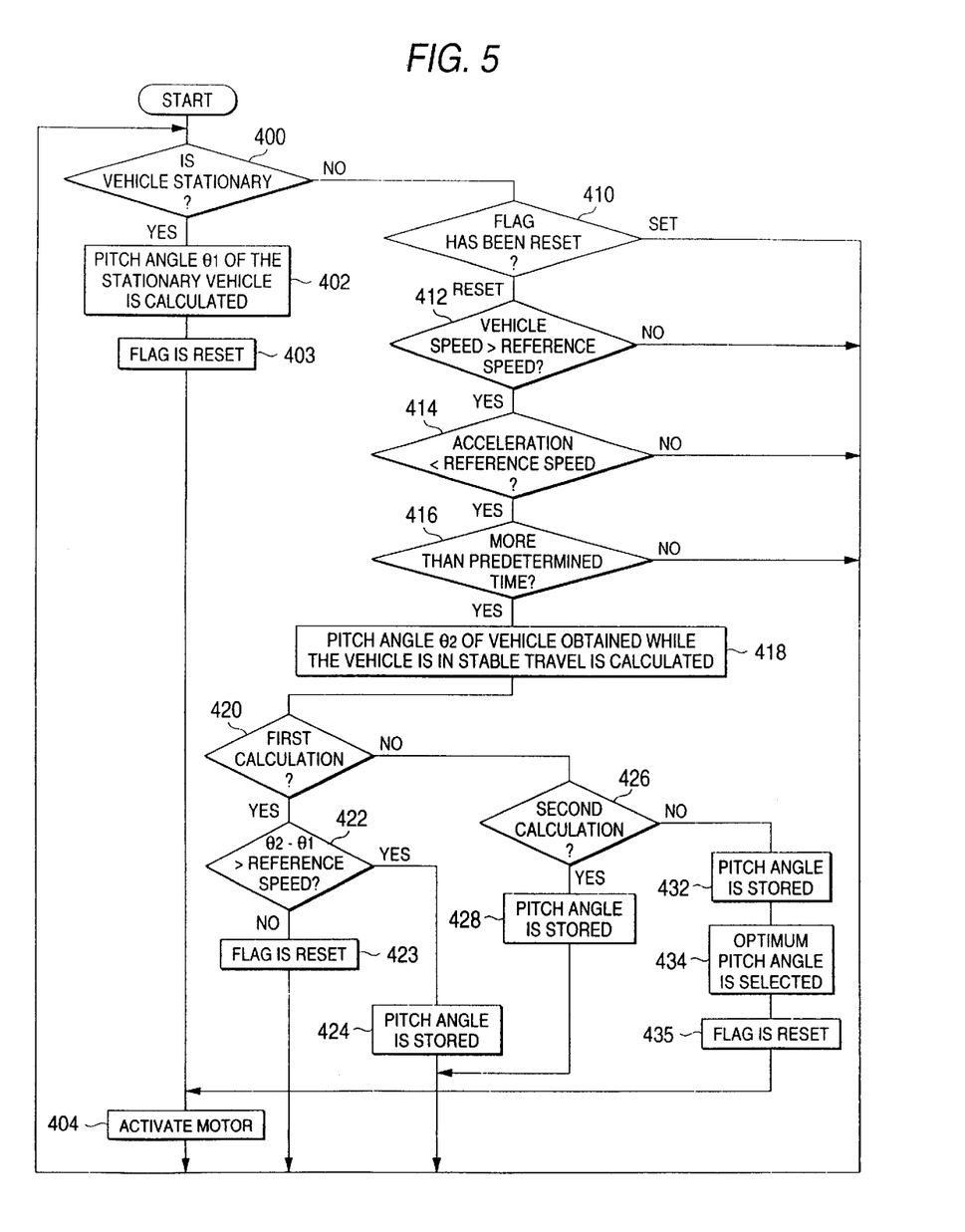
FIG. 5 is a flowchart showing a flow of operation relating to a control unit which serves as the principal section of a headlamp automatic leveling apparatus according to a fourth embodiment of the present invention.

FIG. 5 is a flowchart showing a flow of operation relating to a control unit which serves as the principal section of a headlamp automatic leveling apparatus according to a fourth embodiment of the present invention.

In the third embodiment, in either of the case where the difference between the pitch angles $\theta_1$ and $\theta_2$ is large and the case where the difference is small, the pitch angle $\theta_1$ is inevitably corrected to as to become equal to the pitch angle $\theta_2$. In contrast, the fourth embodiment is arranged such that the pitch angle $\theta_1$ is corrected so as to become equal to the pitch angle $\theta_2$ only when the difference therebetween is great.

Steps 400, 402, 403, and 404 are identical with steps 200, 202, 203, and 204, respectively. Further, steps 410, 412, 414, 416, and 418 are identical with steps 210, 212, 214, 216, and 218, respectively. Hence, repetition of their explanations is omitted here.

In step 420, the CPU 16 determines whether or not the calculation in step 418 of the pitch angle $\theta_2$ of the vehicle while the vehicle is in a stable traveling state is the first calculation. If YES is selected (i.e., the calculation of the pitch angle $\theta_2$ represents the first calculation), processing proceeds to step 422. The CPU 16 then determines whether or not a difference between the pitch angles $\theta_1$ and $\theta_2$ is greater than the predetermined reference value (0.1 degree). If NO is selected (i.e., the difference is less than the predetermined reference value of 0.1 degrees), a flag is reset in step 423, and processing then returns to step 400.

If YES is selected in step 422 (i.e., the difference between the pitch angles $\theta_1$ and $\theta_2$ is greater than 0.1 degree), processing then proceeds to step 424. The pitch angle $\theta_2$ ($\theta_{21}$) is stored in a storage section, and processing then returns to step 400. If NO is selected in step 420 (i.e., the calculation of pitch angle $\theta_2$ in step 418 does represent the first calculation), processing proceeds to step 426. The CPU 16 determines whether or not the calculation of the pitch angle $\theta_2$ in step 418 represents the second calculation. If YES is selected in step 426 (i.e., the calculation of pitch angle $\theta_2$ represents the second calculation), and processing proceeds to step 428. The second pitch angle $\theta_{22}$ is stored in the storage section, processing then returns to step 400. In contrast, if NO is selected in step 426 (the calculation of the pitch angle $\theta_2$ does not represent the second calculation but the third calculation), processing proceeds to step 432. A third pitch angle $\theta_{23}$ obtained while the vehicle is in a stable traveling state is stored in the storage section, and processing returns to step 434. A mean pitch angle of the pitch angles $\theta_{21}$, $\theta_{22}$, and $\theta_{23}$ obtained at the first through third states in which the vehicle travels stably, or a pitch angle which occurs most frequently, is selected as an optimum pitch angle. In step 435, the flag is set, and processing proceeds to step 404. In step 404, a signal is output to the motor driver 18 on the basis of the optimum pitch angle so as to activate the motor 10, and processing returns to step 400.

If NO is selected in step 410 (the flag is set or the calculation of the pitch angle $\theta_2$ represents the fourth calculation), or if NO is selected in any one of steps 412, 414, and 416 (when the vehicle speed is less than the reference value, the acceleration is greater than the reference value, or when a predetermined period of time has not yet elapsed), processing returns to step 400.

In the first through fourth embodiments, calculation of the pitch angle $\theta_2$ of the vehicle while the vehicle is in a stable traveling state requires that the vehicle travels at a speed of 30 km/h or more with an acceleration of 0.5 m/s$^2$ or less for more than three seconds. However, the elements of the set of the conditions: 30 km/h, 0.5 m/s$^2$, and three seconds, are illustrative, and the present invention is not limited to these requirements.

The previous embodiments pertain to the apparatus for automatically leveling a reflector-type headlamp comprising the lamp body 2 mounted on the vehicle body and the reflector 5 attached to the lamp body 2 so as to be pivotable. The same also applies to the automatic leveling of a movable unit-type headlamp comprising a lamp housing mounted on a vehicle body and a lamp body reflector unit attached to the lamp housing so as to be pivotable.

As is evident from the foregoing description, in the headlamp automatic leveling apparatus according to the first aspect of the present invention, the automatic leveling operation is effected only when the vehicle is stationary and when the vehicle is in a stable traveling state. Accordingly, the number of times the actuator is operated is small, resulting in reduced power conservation. Further, the constituent members of a drive mechanism undergo less wear. As a result, there is provided an inexpensive automatic headlamp leveling apparatus which operates correctly.

In one preferred mode of the present invention, since the pitch angle obtained while the vehicle is in a stable traveling state is taken into consideration, an automatic leveling operation is prevented from being effected on the basis of a false pitch angle obtained while the vehicle is stationary. As a result, there is provided an automatic headlamp leveling apparatus which operates correctly.

In another preferred mode of the present invention, at the time of travel of the vehicle, a pitch angle obtained while the vehicle is in a stable traveling state is used as control data in place of the pitch angle obtained while the vehicle is stationary. As a result, an automatic leveling operation is prevented from being performed on the basis of a false pitch angle obtained while the vehicle is stationary. Therefore, there is provided an automatic headlamp leveling apparatus which operates correctly.

In another preferred mode of the present invention, if the pitch angle $\theta_2$ obtained while the vehicle is in a stable traveling state is analogous to the pitch angle $\theta_1$ obtained while the vehicle is stationary, the pitch angle $\theta_1$, which is considered more accurate than the pitch angle $\theta_2$, is used as control data. If a large difference exists between the pitch angles $\theta_1$ and $\theta_2$, the pitch angle $\theta_1$ has a great possibility of being in error. Since the pitch angle $\theta_2$ is used as control data, an automatic leveling operation is prevented from being effected on the basis of the false pitch angle $\theta_1$.

In another preferred embodiment of the present invention, if a large difference exists between the pitch angles $\theta_1$ and $\theta_2$, the operation of the actuator is controlled on the basis of a mean value of pitch angles obtained at a plurality of times during which the vehicle travels stably, or a pitch angle which most frequently occurs. The pitch angle (or control data) obtained while the vehicle is in a stable traveling state is considered highly reliable, thus enabling a correct automatic leveling operation.

In one preferred embodiment of the present invention, detection of a pitch angle at the time of stable traveling occurs over a longer time, and hence the detected pitch angle is highly reliable, thus enabling a correct automatic leveling operation.

What is claimed is:

1. A vehicle headlamp automatic leveling apparatus comprising:
   a headlamp of a vehicle, said headlamp emitting light along a light axis;
   an actuator which pivots said headlamp upward and downward in relation to the vehicle;
   a control unit for controlling operation of said actuator;
   vehicle speed detection means for detecting a vehicle pitch angle, wherein
      said control unit controls operation of said actuator based on a vehicle pitch angle such that the light axis of said headlamp maintains a constant, predetermined angle relative to a road surface on which the vehicle travels, and wherein
      said control unit controls operation of said actuator only when the vehicle is stationary and when the vehicle is in a stable traveling state,
      wherein said control unit controls operation of said actuator based on a vehicle pitch angle detected while the vehicle is stationary, and wherein when said pitch angle detection means detects a vehicle pitch angle while the vehicle is in the stable traveling state, said control unit controls operation of said actuator based on the vehicle pitch angle detected while the vehicle is in the stable traveling state.

2. The vehicle headlamp automatic leveling apparatus as defined in claim 1, wherein a time for detecting vehicle pitch angles while the vehicle is in the stable traveling state is set so as to be longer than a time for detecting vehicle pitch angles while the vehicle is stationary.

3. The vehicle headlamp automatic leveling apparatus according to claim 1, wherein when the vehicle is in the stable traveling state is approximately equal to the vehicle pitch angle detected while the vehicle is stationary, said control unit controls operation of said actuator based on the vehicle pitch angle detected while the vehicle is stationary.

4. The vehicle headlamp automatic leveling apparatus as defined in claim 1, wherein said control unit controls operation of said actuator based on the vehicle pitch angle detected while the vehicle is in the stable traveling state in place of the vehicle pitch angle detected while the vehicle is stationary.

5. The vehicle headlamp automatic leveling apparatus as defined in claim 4, wherein a time for detecting vehicle pitch angles while the vehicle is in the stable traveling state is set so as to be longer than a time for detecting vehicle pitch angles while the vehicle is stationary.

6. The vehicle headlamp automatic leveling apparatus as defined in claim 4, wherein said control unit controls operation of said actuator based on a mean value of pitch angles detected by said pitch angle detection means at a plurality of times while the vehicle is in the stable traveling state, or a pitch angle which occurs most frequently.

7. The vehicle headlamp automatic leveling apparatus as defined in claim 6, wherein a time for detecting vehicle pitch angles while the vehicle is in the stable traveling state is set so as to be longer than a time for detecting vehicle pitch angles while the vehicle is stationary.

8. The vehicle headlamp automatic leveling apparatus as defined in claim 1, wherein when a difference between the vehicle pitch angle detected while the vehicle is in the stable traveling state and the vehicle pitch angle detected while the vehicle is stationary exceeds a predetermined value, said control unit controls operation of said actuator based on the vehicle pitch angle detected while the vehicle is in the stable traveling state in place of the pitch angle detected while the vehicle is stationary.

9. The vehicle headlamp automatic leveling apparatus as defined in claim 8, wherein a time for detecting vehicle pitch angles while the vehicle is in the stable traveling state is set so as to be longer than a time for detecting vehicle pitch angles while the vehicle is stationary.

10. The vehicle headlamp automatic leveling apparatus as defined in claim 8, wherein said control unit controls operation of said actuator based on a mean value of pitch angles detected by said pitch angle detection means at a plurality of times while the vehicle is in the stable traveling state, or a pitch angle which occurs most frequently.

11. The vehicle headlamp automatic leveling apparatus as defined in claim 10, wherein a time for detecting vehicle pitch angles while the vehicle is in the stable traveling state is set so as to be longer than a time for detecting vehicle pitch angles while the vehicle is stationary.

* * * * *